US011601907B2

(12) United States Patent
Tkaczuk et al.

(10) Patent No.: US 11,601,907 B2
(45) Date of Patent: Mar. 7, 2023

(54) WEARABLE DEVICE AND METHOD OF CONTROLLING THE SAME

(71) Applicant: Samsung Electronics Co., Ltd., Suwon-si (KR)

(72) Inventors: Jakub Tkaczuk, Warsaw (PL); Anton Komlev, Warsaw (PL); Roman Fraczek, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 17/470,394

(22) Filed: Sep. 9, 2021

(65) Prior Publication Data

US 2022/0174628 A1 Jun. 2, 2022

(30) Foreign Application Priority Data

Dec. 1, 2020 (KR) .......................... 10-2020-0165540

(51) Int. Cl.
*H04W 56/00* (2009.01)
*H04B 13/00* (2006.01)

(52) U.S. Cl.
CPC ...... *H04W 56/0015* (2013.01); *H04B 13/005* (2013.01)

(58) Field of Classification Search
CPC . H04B 11/00; H04B 13/005; H04W 56/0015; G05B 19/042; G06F 1/12; G06F 1/163; G06F 3/015; H04R 3/005
USPC ........................................................ 370/329
See application file for complete search history.

(56) References Cited

U.S. PATENT DOCUMENTS

| 6,076,016 | A | 6/2000 | Feierbach |
| 2008/0262376 | A1 | 10/2008 | Price |
| 2010/0322294 | A1 | 12/2010 | Park et al. |
| 2012/0128036 | A1* | 5/2012 | Kang .................. H04B 13/005 375/144 |
| 2017/0010674 | A1* | 1/2017 | Ide ....................... H04W 12/065 |
| 2017/0111123 | A1* | 4/2017 | Ouzounov ............. H04L 67/12 |
| 2017/0264374 | A1* | 9/2017 | Oh ........................ H04B 15/005 |
| 2018/0006734 | A1* | 1/2018 | Oh ........................ H04B 7/0619 |
| 2018/0093101 | A1 | 4/2018 | Maile et al. |
| 2018/0288718 | A1* | 10/2018 | Bal ........................... H04L 7/04 |
| 2019/0132812 | A1 | 5/2019 | Kindred et al. |
| 2020/0237221 | A1* | 7/2020 | He .......................... A61B 5/369 |
| 2020/0305792 | A1* | 10/2020 | Visweswara ............ G08B 7/06 |

(Continued)

*Primary Examiner* — Robert J Lopata
(74) *Attorney, Agent, or Firm* — Jefferson IP Law, LLP (57) ABSTRACT

A wearable device capable of synchronizing a plurality of wearable devices using body conductivity is provided. The wearable device includes a clock generator configured to generate a clock signal, a signal generator configured to generate a first synchronization signal based on the clock signal, an electrode configured to transmit and receive an electrical signal through a body while contacting the body, a switch configured to connect the signal generator and the electrode or block a connection between the signal generator and the electrode, and at least one processor configured to control the switch to connect the signal generator and the electrode for transmitting the first synchronization signal generated in the signal generator to the electrode in a master mode, and control the switch to block the connection between the signal generator and the electrode in a slave mode.

20 Claims, 7 Drawing Sheets

(56) References Cited

U.S. PATENT DOCUMENTS

2020/0379572 A1* 12/2020 Marozau ................ H04B 1/385
2021/0384929 A1* 12/2021 Oh ........................ H04B 13/005

* cited by examiner

WEARABLE DEVICE AND METHOD OF CONTROLLING THE SAME

CROSS-REFERENCE TO RELATED APPLICATION(S)

This application is based on and claims priority under 35 U.S.C. § 119(a) of a Korean patent application number 10-2020-0165540, filed on Dec. 1, 2020, in the Korean Intellectual Property Office, the disclosure of which is incorporated by reference herein in its entirety.

BACKGROUND

1. Field

The disclosure relates to a wearable device and a method of controlling the same. More particularly, the disclosure relates to a wearable device that may transmit and receive a synchronization signal through a body.

2. Description of Related Art

A wearable device refers to all electronic devices worn on the body to perform computing activities.

Recently, much research on a hearable device capable of processing a user's voice signal or a sound signal around a user using a microphone mounted in a wearable device has been conducted.

When a user wears a plurality of hearable devices described above, synchronizing the plurality of hearable devices is required to provide more diverse functions.

However, when a radio frequency (RF) communication technology is used for simple time synchronization, a complexity of a circuit may be caused, which is inappropriate in terms of size and energy efficiency of the circuit.

Also, when a wearable device performs another function using the RF communication, the other function may be deteriorated.

In addition, a protocol of the RF communication may be embedded at an arbitrary time.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wearable device that may synchronize a plurality of wearable devices using body conductivity and a method of controlling the same.

Additional aspects will be set forth in part in the description which follows and, in part, will be apparent from the description, or may be learned by practice of the presented embodiments.

In accordance with an aspect of the disclosure, a wearable device is provided. The device includes a clock generator configured to generate a clock signal, a signal generator configured to generate a first synchronization signal based on the clock signal, an electrode configured to transmit and receive an electrical signal through a body while contacting the body, a switch configured to connect the signal generator and the electrode or block a connection between the signal generator and the electrode, and at least one processor configured to control the switch to connect the signal generator and the electrode for transmitting the first synchronization signal generated in the signal generator to the electrode in a master mode, and control the switch to block the connection between the signal generator and the electrode in a slave mode, wherein the at least one processor is further configured to adjust at least one of a frequency or a phase of the clock signal based on a second synchronization signal received through the electrode from another wearable device worn on the body.

The at least one processor is configured to synchronize the first synchronization signal with the second synchronization signal by adjusting at least one of the frequency or the phase of the clock signal.

The at least one processor is configured to determine an operation mode of the wearable device as the slave mode, based on a signal with a period greater than or equal to a predetermined value being received through the electrode.

The at least one processor is configured to determine an operation mode of the wearable device as the master mode, based on a signal with a period greater than or equal to a predetermined value not being received for a predetermined period of time.

The at least one processor is configured to transmit a reset signal to the signal generator in response to detecting a falling edge of the second synchronization signal.

The wearable device further includes a microphone, wherein the at least one processor is configured to process a sound signal received from the microphone based on the clock signal and the first synchronization signal.

The wearable device further includes a communicator configured to wirelessly communicate with the other wearable device, wherein the at least one processor is configured to perform beamforming based on the sound signal received from the microphone and a sound signal received from a second microphone of the other wearable device.

The wearable device further includes a communicator configured to wirelessly communicate with an external terminal, wherein the at least one processor is configured to process a sound signal received from the external terminal based on the clock signal and the first synchronization signal.

The at least one processor is configured to control the communicator to transmit the first synchronization signal to the external terminal.

The at least one processor is configured to control the switch to change an operation mode of the wearable device to the slave mode, based on the wearable device being operating in the master mode for a predetermined period of time.

In accordance with another aspect of the disclosure, a method of controlling a wearable device including an electrode that transmits and receives an electrical signal through a body while contacting the body is provided. The method includes generating, by a clock generator, a clock signal, generating, by a signal generator, a first synchronization signal based on the clock signal, determining an operation mode of the wearable device, transmitting the first synchronization signal to the electrode in response to determining the operation mode of the wearable device as a master mode, blocking a connection between the signal generator and the electrode in response to determining the operation mode of the wearable device as a slave mode, and adjusting at least one of a frequency or a phase of the clock signal based on a second synchronization signal received through the electrode from another wearable device worn on the body, in the slave mode.

The adjusting of the at least one of the frequency or the phase of the clock signal includes synchronizing the first synchronization signal with the second synchronization signal by adjusting at least one of the frequency or the phase of the clock signal.

The determining of the operation mode of the wearable device includes determining the operation mode of the wearable device as the slave mode, based on a signal with a period greater than or equal to a predetermined value being received through the electrode.

The determining of the operation mode of the wearable device includes determining the operation mode of the wearable device as the master mode, based on a signal with a period greater than or equal to a predetermined value not being received for a predetermined period of time.

The method further includes transmitting a reset signal to the signal generator in response to detecting a falling edge of the second synchronization signal.

The method further includes processing a sound signal received from a microphone based on the clock signal and the first synchronization signal.

The method further includes wirelessly communicating with the other wearable device and receiving a sound signal received from a second microphone provided in the other wearable device, and performing beamforming based on the sound signal received from the microphone and the sound signal received from the second microphone.

The method further includes wirelessly communicating with an external terminal and receiving a sound signal from the external terminal, and processing the sound signal received from the external terminal based on the clock signal and the first synchronization signal.

The method further includes transmitting the first synchronization signal to the external terminal.

The method further includes changing the operation mode of the wearable device to the slave mode, based on the wearable device being operating in the master mode for a predetermined period of time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terminologies used herein are for the purpose of describing particular embodiments only and is not intended to limit the disclosure.

It is to be understood that the singular forms are intended to include the plural forms as well, unless the context clearly dictates otherwise.

It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms.

Further, the terms such as "part", "device", "block", "member", "module", and the like may refer to a unit for processing at least one function or act. For example, the terms may refer to at least process processed by at least one hardware, such as field-programmable gate array (FPGA)/application specific integrated circuit (ASIC), software stored in memories or processors.

Reference will now be made in detail to the embodiments, examples of which are illustrated in the accompanying drawings, wherein like reference numerals refer to like elements throughout.

Hereinafter, embodiments will be described in detail with reference to the accompanying drawings.

Figure 1:
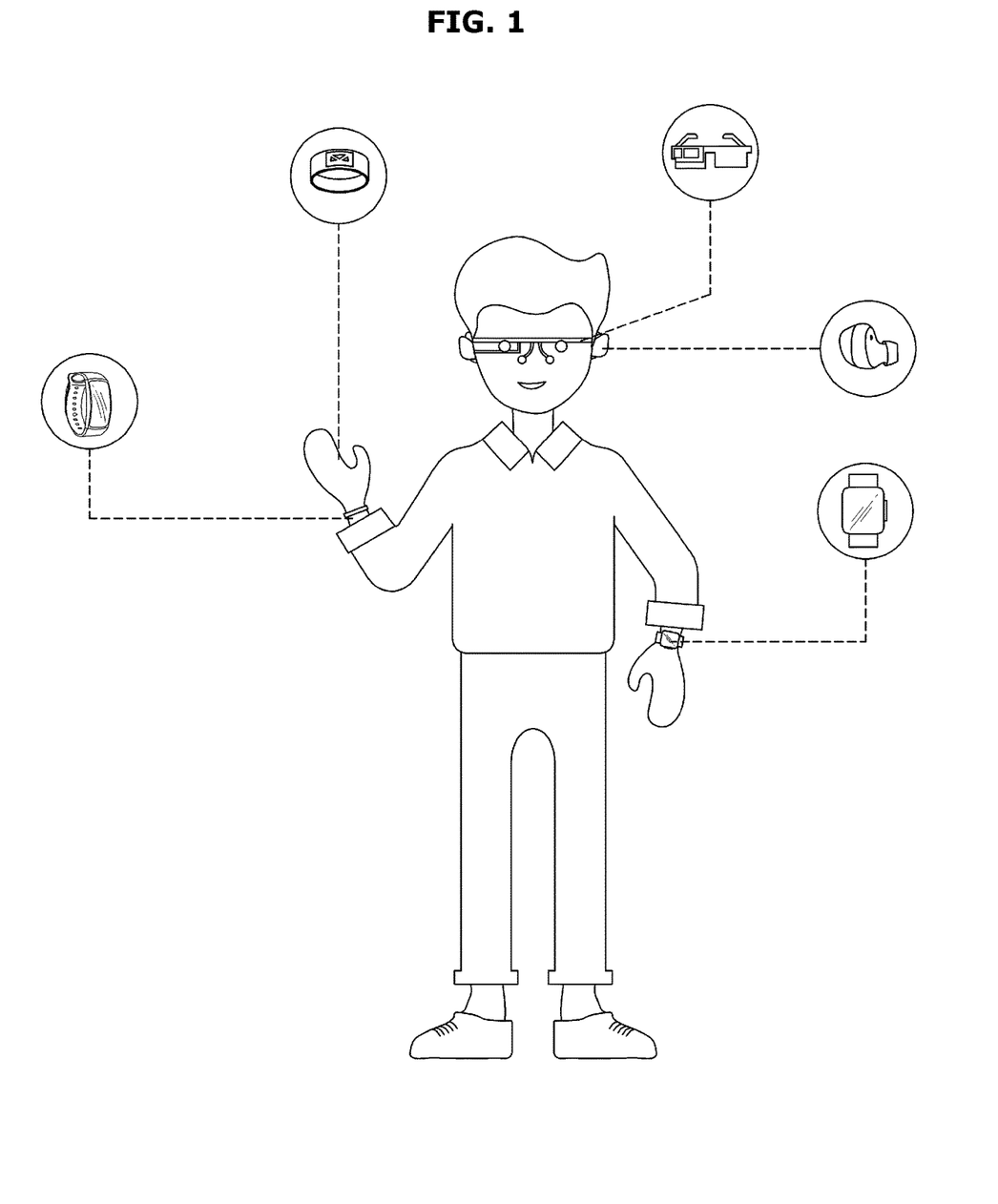
FIG. 1 is a diagram illustrating an example of a wearable device according to an embodiment of the disclosure.

FIG. 1 is a diagram illustrating an example of a wearable device according to an embodiment of the disclosure.

Referring to FIG. 1, the wearable device 1 according to an embodiment may include one of a smart watch, a smart band, a smart ring, smart glasses or smart earphones (wireless earphones).

Further, the wearable device 1 according to an embodiment may include various types of devices such as a smart belt, smart shoes, smart socks, a smart shirt, smart pants, and the like.

That is, the wearable device 1 may refer to any electronic device that may be worn on a body, communicate with other wearable devices and perform computing activities.

Hereinafter, an example where the wearable device 1 is smart earphones is described for convenience of explanation. More specifically, it is clarified that the wearable device 1 in the disclosure refers to one side of the smart earphones, not a pair.

As shown in FIG. 1, a user may wear a plurality of wearable devices, because a variety of wearable devices are being developed.

For instance, a user may wear the wearable device 1 on each of the left and right ears, respectively.

Hereinafter, a circuit configuration of the wearable device 1 is described below with reference to FIG. 2.

Figure 2:
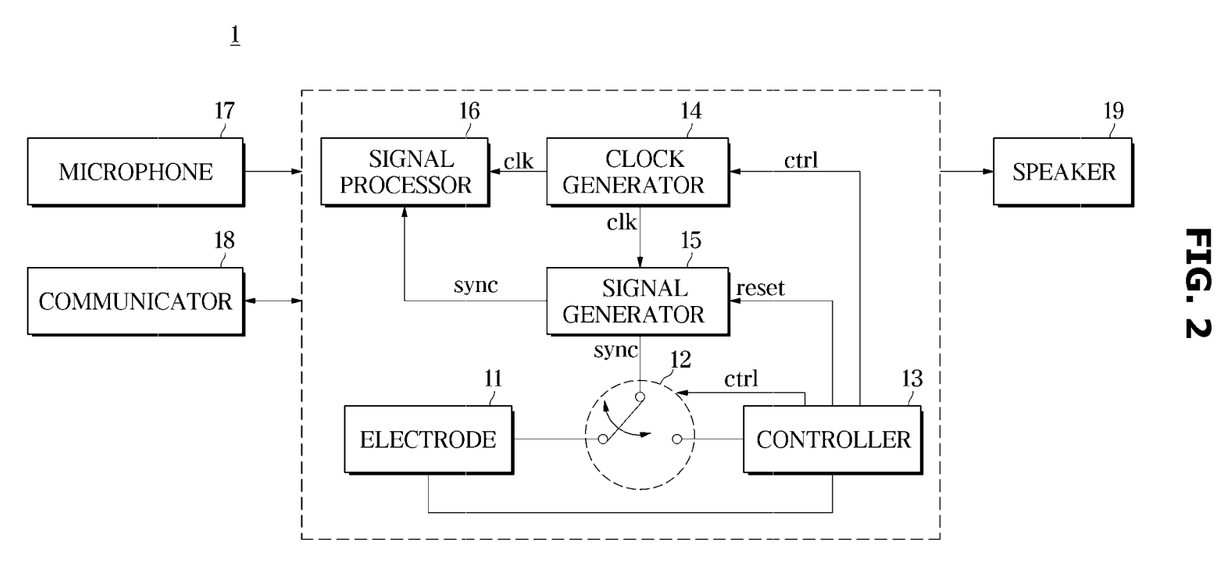
FIG. 2 is a control block diagram illustrating a wearable device according to an embodiment of the disclosure.

FIG. 2 is a control block diagram illustrating a wearable device according to an embodiment of the disclosure.

Referring to FIG. 2, according an embodiment, the wearable device 1 may include an electrode 11, a switching element 12, a clock generator 14, a signal generator 15, a signal processor 16, a microphone 17, a communicator 18, a speaker 19, and a controller 13. Here, one of the elements shown in FIG. 2 may be omitted according to an embodiment.

The electrode 11 may be provided at a position where the wearable device 1 makes contact with a user's skin while worn on a body of a user. Therefore, the electrode 11 may be electrically connected to the user's body.

The electrode 11 may be electrically connected to another electrode in contact with the user's body through the user's body. Also, the electrode 11 may transmit and receive an electrical signal to the other electrode in contact with the user's body.

That is, the electrode 11 may transmit and receive the electrical signal through the body while contacting the body.

Although not illustrated, the wearable device 1 may include at least one sensor that may output a sensing value to identify whether the wearable device 1 is worn on the body.

For example, the at least one sensor may include a current detection sensor to output a sensing value according to whether the current can flow through the electrode 11, a capacitive sensor to detect a capacitance value that changes in response to the wearable device 1 being worn on the body, and the like.

The clock generator 14 may include all circuits to generate a clock signal clk for operating a variety of circuits included in the wearable device 1.

The clock signal clk may refer to a square wave signal where a logic state high (high, 1) and low (low, 0) appear periodically, and be used for synchronization process that processes a signal in a digital circuit.

An element to define the clock signal clk may be a frequency, a duty ratio, a phase, etc.

For example, the clock generator 14 may be an oscillator that may generate the clock signal clk, and the oscillator may include a variable frequency oscillator that may change an oscillation frequency.

The signal generator 15 may refer to all circuits that may generate a synchronization signal sync based on the clock signal clk. The synchronization signal sync may refer to all periodic signals generated corresponding to a period, a frequency, and the like of the clock signal clk.

For instance, the synchronization signal sync may refer to a signal obtained by converting a frequency and/or a duty ratio of the clock signal clk. For example, a period of the synchronization signal sync may be set to an integer multiple of the period of the clock signal clk.

The signal generator 15 for the above may include a counter circuit.

According to an embodiment, the signal generator 15 may receive a reset signal, and be initialized in response to receiving the reset signal.

The signal processor 16 may process various types of signals based on the clock signal clk outputted from the clock generator 14 and the synchronization signal sync outputted from the signal generator 15. Specifically, the signal processor 16 may operate based on the clock signal clk and the synchronization signal sync.

According to an embodiment, the signal processor 16 may process a sound signal received from the microphone 17, and also process a sound signal received from the communicator 18.

The signal processor 16 may include at least one processor.

The sound signal processed by the signal processor 16 may be transmitted to an external terminal through the communicator 18, and be outputted through the speaker 19.

The switching element 12 may selectively connect the signal generator 15 and the electrode 11, or the signal generator 15 and the controller 13.

The switching element 12 may be operated based on a control signal of the controller 13.

The switching element 12 may include all switches capable of changing a signal path through an electric circuit by connecting or blocking the electric circuit. For example, the switching element 12 may include an insulated gate bipolar transistor (IGBT). Also, the number of switching elements 12 may vary as needed.

The switching element 12 may transmit the synchronization signal sync, outputted from the signal generator 15, to the electrode 11 or the controller 13 according to the control signal of the controller 13.

The controller 13 may determine an operation mode of the wearable device 1 based on an electrical signal received through the electrode 11. Also, the controller 13 may control the switching element 12 according to the operation mode of the wearable device 1. Specifically, when a slave mode is determined as the operation mode of the wearable device 1, the controller 13 may control the switching element 12 so that the synchronization signal sync outputted from the signal generator 15 is transmitted to the controller 13. When a master mode is determined as the operation mode of the wearable device 1, the controller 13 may control the switching element 12 so that the synchronization signal sync outputted from the signal generator 15 is transmitted to the electrode 11.

The controller 13 may transmit the reset signal to the signal generator 15 based on the electrical signal received through the electrode 11.

Also, in the slave mode, the controller 13 may adjust at least one of a frequency or a phase of the clock signal clk based on the electrical signal received through the electrode 11.

The controller 13 may include at least one processor and at least one memory.

The at least one memory may store a program and data for controlling the elements included in the wearable device 1, and memorize temporary control data generated while controlling the elements include in the wearable device 1.

For instance, the at least one memory may include a program for determining the operation mode of the wearable device 1, a program for controlling the switching element 12 according to the operation mode of the wearable device 1, a program for adjusting the at least one of the frequency or the phase of the clock signal clk generated from the clock generator 14, a program for transmitting the reset signal to the signal generator 15, and the like.

Here, the memory may include a non-volatile memory such as read only memory (ROM), flash memory, etc., for long-term storage of data, and a volatile memory such as static random access memory (S-RAM), dynamic random access memory (D-RAM), etc., for temporarily storing data.

The at least one processor included in the controller 13 may control each element of the wearable device 1 according to the data and program stored in the at least one memory.

The at least one processor may include an arithmetic circuit that performs logical operations, arithmetic operations, etc., a memory circuit that memorizes the calculated data, and the like.

For example, the at least one processor included in the controller 13 may compare the synchronization signal sync, received from the signal generator 15, to a synchronization signal received from another wearable device through the electrode 11, and adjust the clock signal clk according to a result of the comparison in the slave mode.

As another example, the at least one processor included in the controller 13 may transmit the reset signal to the signal generator 15 in response to detecting a falling edge of the synchronization signal received from the other wearable device through the electrode 11 in the slave mode.

An operation of the controller 13 is described in greater detail below.

The microphone 17 may collect ambient sound of the wearable device 1, and convert the collected sound into an electrical sound signal. The sound signal collected by the microphone 17 may be processed by the signal processor 16.

The communicator 18 may include a communication module for communicating with another terminal (e.g. a smart phone, another wearable device) including a short-range communication module and/or a wireless communication module.

Specifically, the communicator 18 may include at least one communication module transmitting and receiving data according to a predetermined communication protocol. For instance, the communicator 18 may include a wireless communication module and/or a short-range communication module.

The wireless communication module may include at least one of communication modules capable of connecting to a wireless communication network by way of wireless communication, such as wireless fidelity (WiFi), wireless broadband (WiBro), global system for mobile communication (GSM), code division multiple access (CDMA), wideband code division multiple access (WCDMA), universal mobile telecommunications system (UMTS), time division multiple access (TDMA), long term evolution (LTE), $4^{th}$ generation mobile communication, $5^{th}$ generation mobile communication, and the like.

The short-range communication module may include at least one of communication modules capable of transmitting and receiving signals using a wireless communication network in a short distance, such as Bluetooth module, infrared communication module, radio frequency identification (RFID) communication module, wireless local access network (WLAN) communication module, near field communication (NFC) communication module, zigbee communication module, Z-wave communication module, wife direct communication module, Bluetooth low energy (BLE) module, and the like.

Also, the communicator 18 may include an antenna for transmitting or receiving a wireless signal to or from free space, a modulator/demodulator for modulating data to be transmitted or demodulating a received wireless signal, and the like.

The speaker 19 may convert a sound signal amplified by an audio amplifier into sound (sound wave). The audio amplifier may refer to an element for amplifying the sound signal outputted from the signal processor 16.

The speaker 19 may include a thin film that vibrates according to an electrical sound signal and sound waves may be generated by the vibration of the thin film.

For instance, the signal processor 16 may process a sound signal received from a smart phone through the communicator 18, the audio amplifier may amplify the sound signal processed by the signal processor 16, and the speaker 19 may convert the amplified sound signal into sound and output the sound.

Each element of the wearable device 1 according to an embodiment has been described above.

Hereinafter, a method of controlling the wearable device 1 is described below with reference to FIGS. 3 to 5.

Figure 3:
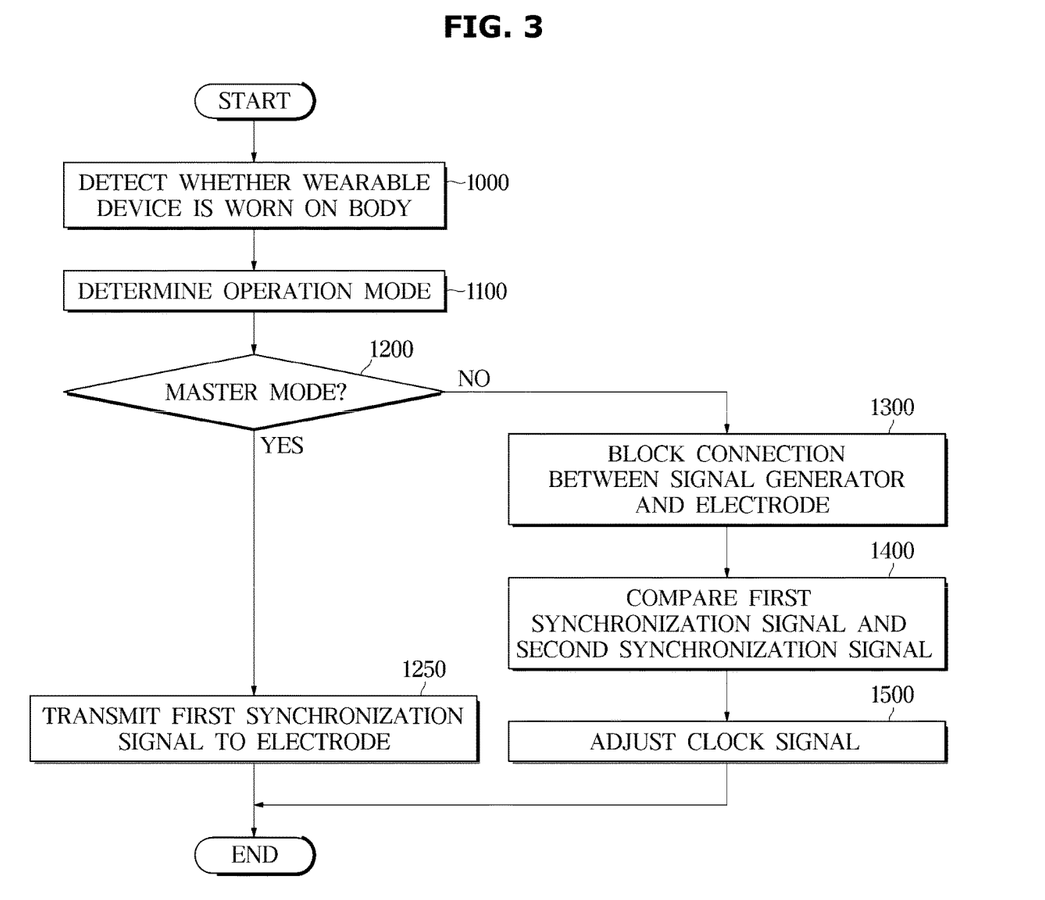
FIG. 3 is a flowchart of a method of controlling a wearable device according to an embodiment of the disclosure.

FIG. 3 is a flowchart of a method of controlling a wearable device according to an embodiment of the disclosure. FIG. 4 is a control block diagram illustrating a synchronization process between wearable devices according to an embodiment of the disclosure. FIG. 5 illustrates a synchronization signal and a clock signal outputted by wearable devices according to an embodiment of the disclosure.

Hereinafter, for convenience of explanation, it is assumed that a user wears a plurality of wearable devices 1 according to an embodiment, and each of the plurality of wearable devices 1 worn at different positions is referred to as a first wearable device 10 and a second wearable device 20.

For example, the first wearable device 10 may be worn on one ear of the user and the second wearable device 20 may be worn on the other ear of the user.

Figure 4:
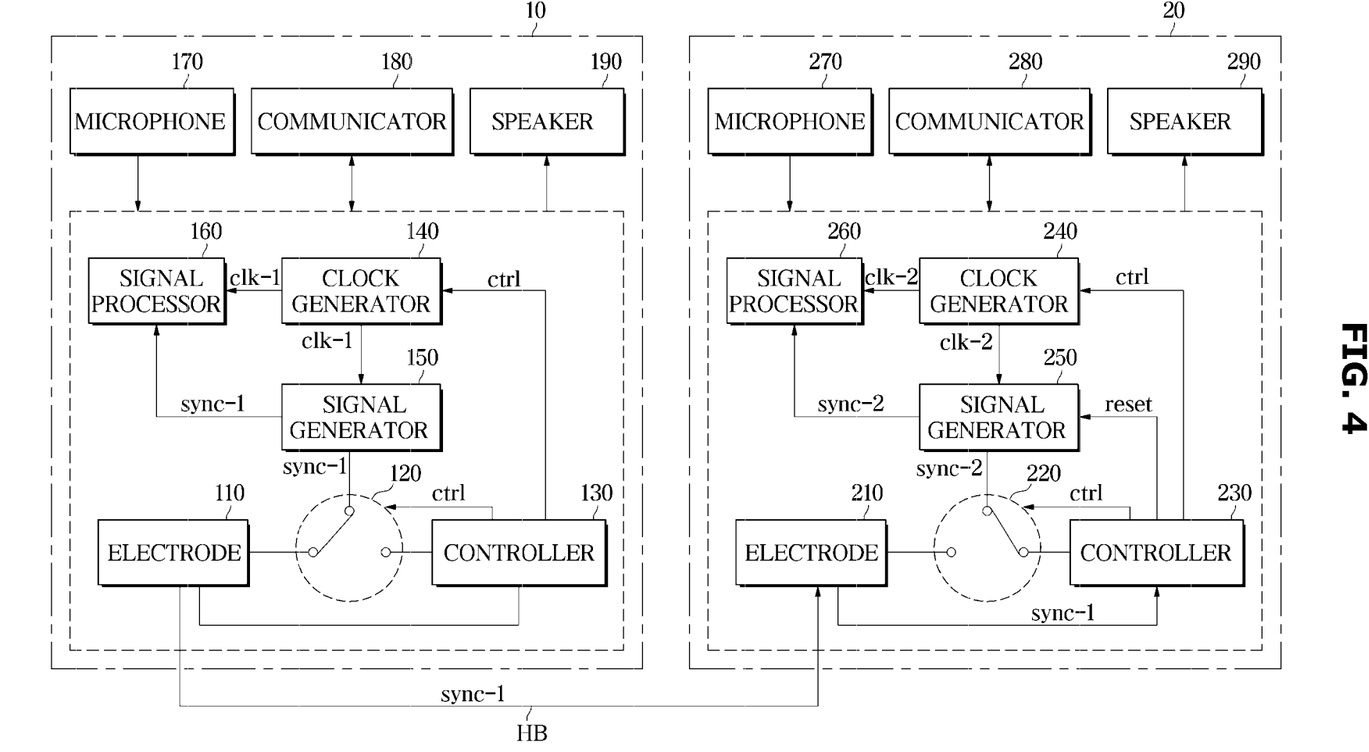
FIG. 4 is a control block diagram illustrating a synchronization process between wearable devices according to an embodiment of the disclosure.

Referring to FIG. 4, control block diagrams of the first wearable device 10 and the second wearable device 20 are illustrated. Hereinafter, it is assumed that both of the first wearable device 10 and the second wearable device 20 are the wearable device 1 according to an embodiment.

Also, the following description is made based on the first wearable device 10 as the wearable device 1 operating in the master mode, and the second wearable device 20 as the wearable device 1 operating in the slave mode.

In addition, when power is applied to the first wearable device 10, a clock generator 140 may continuously generate a clock signal clk-1, and when power is applied to the second wearable device 20, a clock generator 240 may continuously generate a clock signal clk-2.

Referring to FIGS. 3 and 4, a controller 130 may identify whether the first wearable device 10 is worn on a body of the user at operation 1000. The above-described method may be used as a method of identifying whether the first wearable device 10 is worn on the body. For example, the controller 130 may identify whether the first wearable device 10 is worn on the body by detecting changes in capacitance value outputted from a capacitive sensor.

As another example, the controller 130 may identify whether the first wearable device 10 is worn on the body according to whether the current can flow through the electrode 11.

The controller 130 may determine an operation mode of the first wearable device 10 in response to the first wearable device 10 being worn on the body at operation 1100.

Specifically, the controller 130 may determine the operation mode of the first wearable device 10 based on an electrical signal received through the electrode 11.

The operation mode may be divided into a master mode and a slave mode. The master mode may refer to a mode that serves as a synchronization standard for synchronizing the first wearable device 10 and another wearable device (e.g. the second wearable device 20) worn on the body. The slave mode may refer to a mode for the first wearable device 10 to be synchronized based on a signal outputted from the second wearable device 20.

That is, when the first wearable device 10 operates in the master mode, the second wearable device 20 is synchronized based on a synchronization signal outputted from the first wearable device 10. When the first wearable device 10 operates in the slave mode and the second wearable device 20 operates in the master mode, the first wearable device 10 is synchronized based on a synchronization signal outputted from the second wearable device 20.

Based on a signal with a period greater than or equal to a predetermined value being received through the electrode 11, the controller 130 may determine an operation mode of the wearable device as the slave mode.

The predetermined value may be set based on a period of a first synchronization signal sync-1 generated by a signal generator 150. For instance, with the assumption that the period of the first synchronization signal sync-1 is 1 ms, the predetermined value may be set to 0.8 ms which is shorter than the period of the first synchronization signal sync-1.

That is, the period of the predetermined value may refer to a period shorter than the period of the first synchronization signal sync-1.

When the signal with the period greater than or equal to the predetermined value is received through an electrode 110, it may be estimated that the signal is transmitted through an electrode 210 of the second wearable device 20 and an operation mode of the second wearable device 20 is the master mode.

As another example, when a signal with a period greater than or equal to a predetermined value is not received through the electrode 11 for a predetermined period of time, the controller 130 may determine an operation mode of the first wearable device 10 as the master mode.

That is, when no signal is received through the electrode 11 even after the first wearable device 10 is worn on the body, it is estimated that the second wearable device 20 worn on the body in the master mode does not exist.

In this instance, the predetermined period of time may be set to a period of time longer than the period of the first synchronization signal sync-1 outputted from the signal generator 150.

When the first wearable device 10 and the second wearable device 20 are simultaneously worn, both of the first wearable device 10 and the second wearable device 20 may momentarily operate in the master mode. In this instance, the first synchronization signal sync-1 transmitted through the electrode 110 of the first wearable device 10 and the second synchronization signal sync-2 transmitted through the electrode 210 of the second wearable device 20 may collide with each other. To prevent the above collision, a multiple access with collision avoidance (MACA) may be used.

Specifically, when the first wearable device 10 operating in the master mode transmits the first synchronization signal sync-1 through the electrode 110 and receives the second synchronization signal sync-2 through the electrode 110 from the second wearable device 20, the controller 130 may control a switching element 120 to temporarily block a connection between the signal generator 150 and the electrode 110.

Even after temporary blocking of the connection between the signal generator 150 and the electrode 110, when the second synchronization signal sync-2 is continuously received through the electrode 110 from the second wearable device 20, the controller 130 may determine the operation mode of the first wearable device 10 as the slave mode.

When the operation mode of the first wearable device 10 is determined as the master mode (Yes in operation 1200), the controller 130 may control the switching element 120 to transmit the first synchronization signal sync-1 outputted from the signal generator 150 to the electrode 110 at operation 1250.

That is, in response to determining the operation mode of the first wearable device 10 as the master mode, the first wearable device 10 may transmit the first synchronization signal sync-1 to another wearable device 1, worn on the body (Human Body), through the electrode 110, and the electrode 210 of the second wearable device 20 may receive the first synchronization signal sync-1, outputted from the signal generator 150, through the body (HB).

A frequency of the first synchronization signal sync-1 may be set in advance and be set to 20 MHz or more considering conduction efficiency in the body.

Hereinafter, operations of synchronization based on the first synchronization signal sync-1 outputted from the signal generator 150, when the second wearable device 20 operates in the slave mode, are described.

As described above, a controller 230 may detect whether the second wearable device 20 is worn on the body of the user at operation 1000. Also, the controller 230 may determine the operation mode of the second wearable device 20 at operation 1100.

In response to determining the operation mode of the second wearable device 20 as the slave mode (No in operation 1200), the controller 230 may control a switching element 220 to block a connection between a signal generator 250 and the electrode 210 at operation 1300.

More specifically, the controller 230 may control the switching element 220 not to transmit the second synchronization signal sync-2 to the electrode 210 in the slave mode of the second wearable device 20. Here, the second synchronization signal sync-2 is outputted from the signal generator 250.

Also, the controller 230 may control the switching element 220 to transmit the second synchronization signal sync-2, outputted from the signal generator 250, to the controller 230.

When the operation mode of the second wearable device 20 is the slave mode, the first synchronization signal sync-1, transmitted through the electrode 110 of the first wearable device 10 operating in the master mode, may be received in the electrode 210 of the second wearable device 20 through the body (HB), and the controller 230 may receive the first synchronization signal sync-1 through the electrode 210.

That is, the controller 230 may receive both of the first synchronization signal sync-1, outputted from the signal generator 150 of the first wearable device 10, and the second synchronization signal sync-2 outputted from the signal generator 250 of the second wearable device 20.

The controller 230 may compare the first synchronization signal sync-1 and the second synchronization signal sync-2 at operation 1400. Also, the controller 230 may adjust the clock signal clk-2 according to a result of the comparison at operation 1500.

Specifically, the controller 230 may adjust at least one of a frequency or a phase of the clock signal clk-2 generated by the clock generator 240 based on the first synchronization signal sync-1 and the second synchronization signal sync-2.

For example, the controller 230 may synchronize the first synchronization signal sync-1 and the second synchronization signal sync-2 by adjusting at least one of the frequency or the phase of the clock signal clk-2 generated by the clock generator 240.

According to an embodiment, the controller 230 may transmit a reset signal to the signal generator 250 in response to detecting a falling edge of the first synchronization signal sync-1, to more precisely compare the first synchronization signal sync-1 and the second synchronization signal sync-2.

The falling edge of the first synchronization signal sync-1 may refer to a point in time when a pattern of the first synchronization signal sync-1 ends. Also, when the controller 230 resets the signal generator 250 using the detection of the falling edge, the first synchronization signal sync-1 may be precisely compared to the second synchronization signal sync-2 generated corresponding to the adjusted clock signal clk-2.

Figure 5:
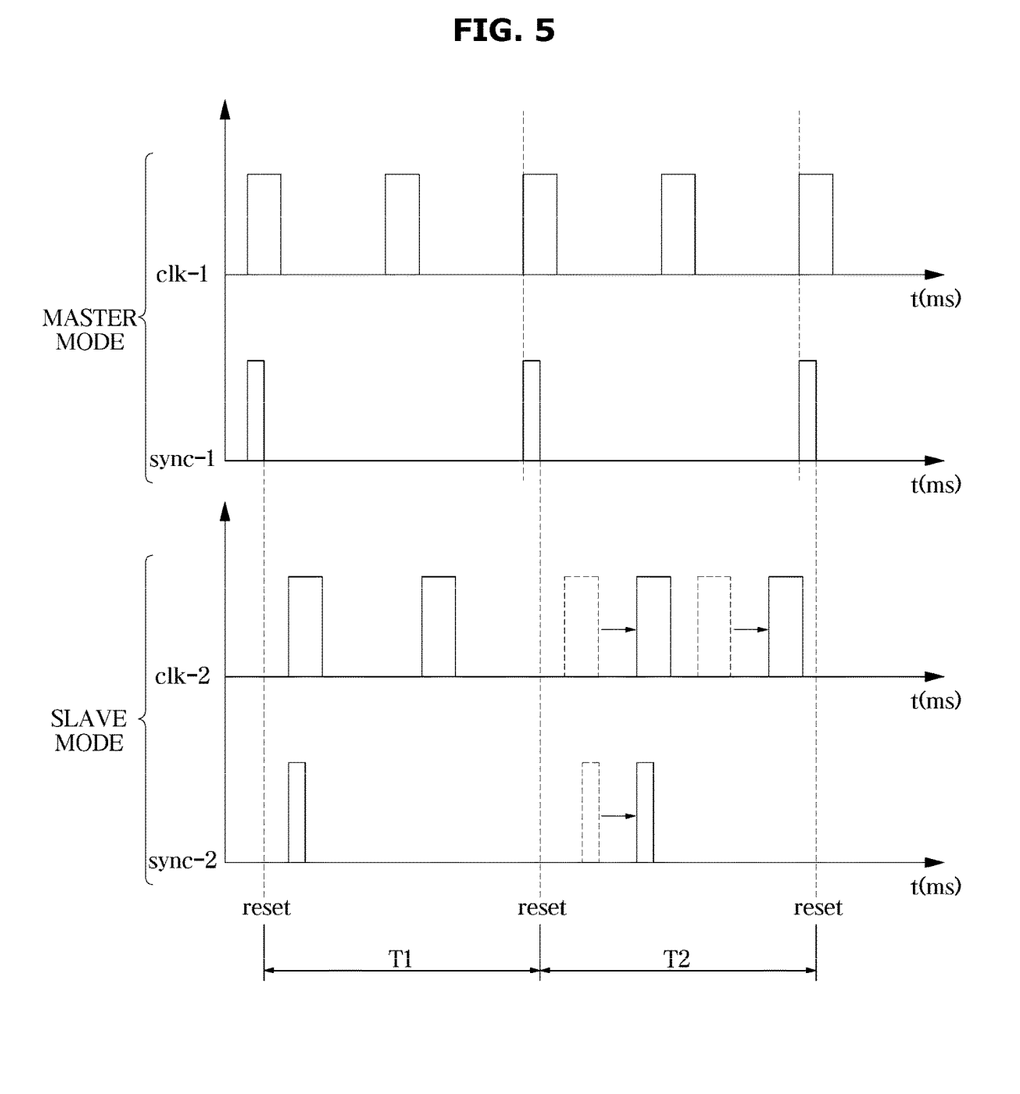
FIG. 5 illustrates a synchronization signal and a clock signal outputted by wearable devices according to an embodiment of the disclosure.

Referring to FIG. 5, a synchronization process of the first synchronization signal sync-1 and the second synchronization signal sync-2 is illustrated.

Based on a reset signal, in a first section T1, a phase of the first synchronization signal sync-1 precedes that of the second synchronization signal sync-2.

The controller 230 may control the clock generator 240 to delay the phase of the clock signal clk-2 based on the result that the phase of the first synchronization signal sync-1 precedes that of the second synchronization signal sync-2.

In a second section T2, the phase of the second synchronization signal sync-2, generated based on the adjusted clock signal clk-2, precedes that of the first synchronization signal sync-1.

Accordingly, the controller 230 may control the clock generator 240 to delay the phase of the clock signal clk-2.

Through the synchronization process described above, the first synchronization signal sync-1 and the second synchronization signal sync-2 may be synchronized.

The controller 230 may identify that the synchronization process is complete in response to the first synchronization signal sync-1 and the second synchronization signal sync-2 being matched.

According to another embodiment, to more precisely compare the first synchronization signal sync-1 and the second synchronization signal sync-2, the controller 230 may transmit a reset signal to the signal generator 250 in response to detecting a rising edge of the first synchronization signal sync-1.

According to an embodiment of the disclosure, the wearable devices 1 worn on the body may be easily synchronized without using communication technologies such as Bluetooth, WiFi, body area network (BAN), etc., and thus disadvantages of the related art may be overcome.

Although not illustrated in drawings, when the wearable device 1 operates in the master mode for a predetermined period of time, the controller 13 may control the switching element 12 to convert the operation mode of the wearable device 1 to the salve mode considering battery consumption.

That is, when the first wearable device 10 operates in the master mode for a first predetermined period of time, the controller 130 may control the switching element 120 to block a connection between the signal generator 150 and the electrode 110. Also, the controller 230 may convert the operation mode of the second wearable device 20 to the master mode in response to not receiving the first synchronization signal sync-1 through the electrode 210 for a second predetermined period of time.

In response to the synchronization of the first wearable device 10 and the second wearable device 20, the first wearable device 10 and the second wearable device 20 may perform various functions based on the synchronization.

Figure 6:
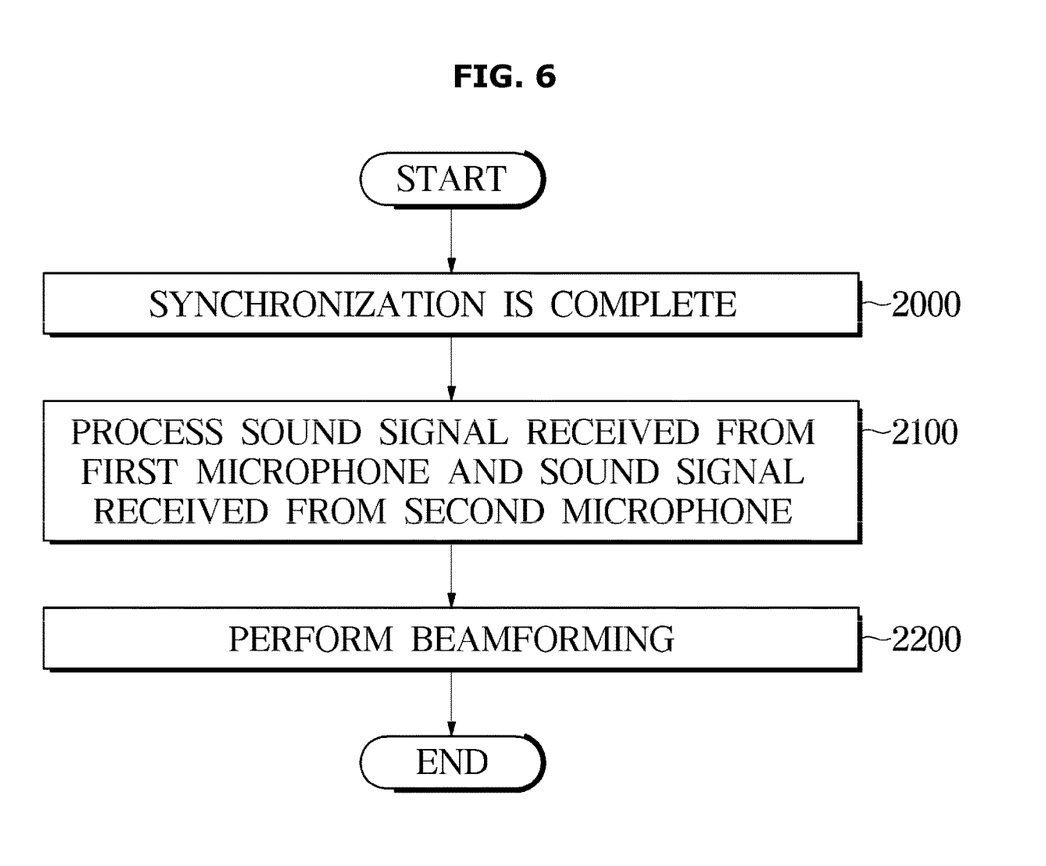
FIGS. 6 and 7 are flowcharts illustrating a method of controlling a wearable device according to various embodiments of the disclosure.
Figure 7:
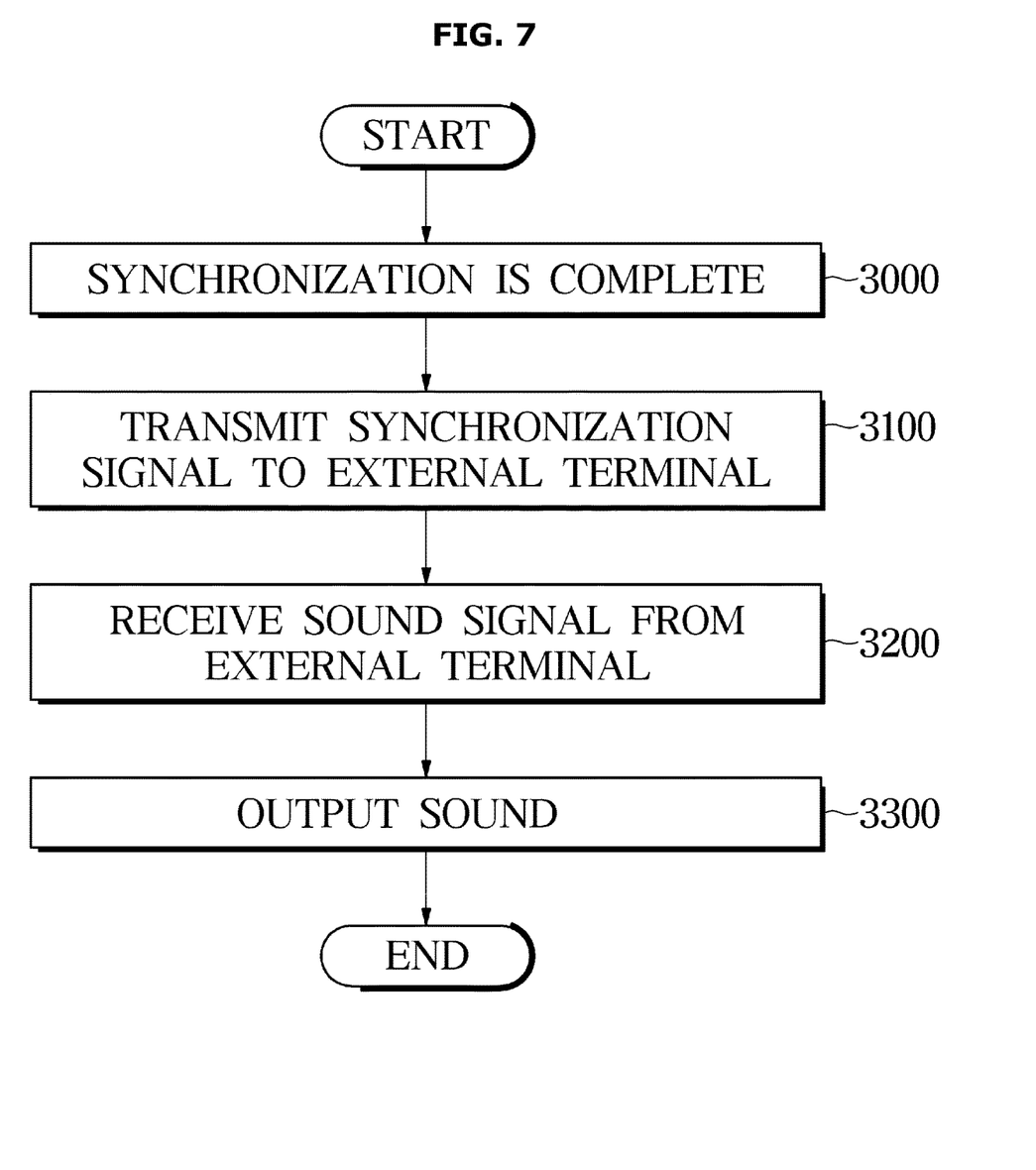

FIGS. 6 and 7 are flowcharts illustrating a method of controlling a wearable device according to various embodiments of the disclosure.

According to another embodiment, the first wearable device 10 and the second wearable device 20 may perform beamforming using microphones 170 and 270. Each of the microphones 170 and 270 is provided in each of the first wearable device 10 and the second wearable device 20.

Referring to FIG. 6 in view of the first wearable device 10, the first wearable device 10 may identify whether synchronization is complete at operation 2000.

For instance, when synchronization of the second wearable device 20 is identified to be completed, the controller 230 of the second wearable device 20 may control the communicator 280 to transmit a synchronization completion message to the first wearable device 10. Also, the communicator 180 of the first wearable device 10 may receive the synchronization completion message from the communicator 280 of the second wearable device 20.

The controller 130 may identify that the synchronization of the second wearable device 20 is complete, in response to receiving the synchronization completion message received from the communicator 180.

In response to the completion of the synchronization of the second wearable device 20, the controller 130 may control the communicator 180 to receive a sound signal received from the microphone 270 of the second wearable device 20.

Specifically, the controller 130 may control the communicator 180 to transmit a message requesting transmission of the sound signal to the second wearable device 20. Also, in response to receiving the message through the communicator 280, the controller 230 of the second wearable device 20 may control the communicator 280 to transmit the sound signal, received from the microphone 270, to the first wearable device 10.

In this instance, the sound signal received through the microphone 270 may refer to a sound signal processed by a signal processor 260 at operation 2100.

The signal processor 160 may perform beamforming based on the sound signal received from the microphone 170 of the first wearable device 10 and the sound signal received from the microphone 270 of the second wearable device 20 at operation 2200.

That is, because the first wearable device 10 and the second wearable device 20 are completely synchronized, a location of a sound source may be identified by processing the sound signal received from the microphone 170 of the first wearable device 10 and the sound signal received from the microphone 270 of the second wearable device 20.

Referring to FIG. 6 in view of the second wearable device 20, the second wearable device 20 may identify whether synchronization is complete at operation 2000.

For instance, the controller 230 of the second wearable device 20 may identify whether synchronization is complete based on a result of comparing the first synchronization signal sync-1 and the second synchronization signal sync-2.

In response to the completion of synchronization of the second wearable device 20, the controller 230 may control the communicator 280 to receive a sound signal received from the microphone 170 of the first wearable device 10.

Specifically, the controller 230 may control the communicator 280 to transmit a message requesting transmission of the sound signal to the first wearable device 10. Also, in response to receiving the message through the communicator 180, the controller 130 of the first wearable device 10 may control the communicator 180 to transmit the sound signal, received from the microphone 170, to the second wearable device 20.

In this instance, the sound signal received from the microphone 170 may refer to a sound signal processed by the signal processor 160 at operation 2100.

The signal processor 260 may perform beamforming based on the sound signal received from the microphone 170 of the first wearable device 10 and the sound signal received from the microphone 270 of the second wearable device 20 at operation 2200.

According to another embodiment, the wearable device 1 may receive, from an external terminal, a sound signal whose phase is corrected according to a synchronization signal.

Referring to FIG. 7 in view of the first wearable device 10, when the first wearable device 10 and the second wearable device 20 are synchronized at operation 3000, the first wearable device 10 may transmit the first synchronization signal sync-1 to the external terminal, e.g. a smart phone at operation 3100.

That is, the controller 130 may control the communicator 180 to transmit the first synchronization signal sync-1 outputted from the signal generator 150 to the external terminal.

Accordingly, the external terminal may correct a phase of streaming sound signal based on the first synchronization signal sync-1, and transmit the corrected sound signal to the first wearable device 10 and the second wearable device 20.

The first wearable device 10 may receive the sound signal from the external terminal through the communicator 180 at operation 3200. Also, the signal processor 160 may process the sound signal received from the external terminal based on the first synchronization signal sync-1 and the clock signal clk-1.

In addition, the sound signal processed by the signal processor 160 may be outputted in a form of sound wave through a speaker 190 at operation 3300.

Referring to FIG. 7 in view of the second wearable device 20, when the second wearable device 20 and the first wearable device 10 are synchronized at operation 3000, the second wearable device 20 may transmit the second synchronization signal sync-2 to an external terminal, e.g. a smart phone at operation 3100.

That is, the controller 230 may control the communicator 280 to transmit the second synchronization signal sync-2 outputted from the signal generator 250 to the external terminal.

Accordingly, the external terminal may correct a phase of streaming sound signal based on the second synchronization signal sync-2, and transmit the corrected sound signal to the first wearable device 10 and the second wearable device 20.

The second wearable device 20 may receive the sound signal from the external terminal through the communicator 280 at operation 3200. Also, the signal processor 260 may process the sound signal received from the external terminal based on the second synchronization signal sync-2 and the clock signal clk-2.

In addition, the sound signal processed by the signal processor 260 may be outputted in a form of sound wave through a speaker 290 at operation 3300.

According to embodiments of the disclosure, precise sound synchronization can be achieved among the wearable devices which are not directly connected to each other in a playback mode.

As is apparent from the above, according to the embodiment of the disclosure, the wearable device and the method of controlling the same can provide more diverse functions, e.g. beamforming, to a user by easily synchronizing the wearable devices worn by the user.

Further, the wearable device and the method of controlling the same can synchronize the wearable devices using a simple circuit without using wireless communication technology.

Embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), magnetic tapes, magnetic disks, floppy disks, and optical recording medium.

The computer-readable code may be provided in the form of a non-transitory storage medium. Here, when a storage medium is referred to as "non-transitory", it can be understood that the storage medium is tangible and does not include a signal, but rather that data is semi-permanently or temporarily stored in the storage medium.

According to one embodiment, the methods according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed through an application store (e.g., Play Store TM) online. In the case of online distribution, at least a portion of the computer program product (e.g., downloadable app) may be stored at least temporarily or may be temporarily generated in a machine-readable storage medium, such as a memory of a server of a manufacturer, a server of an application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
   a clock generator configured to generate a clock signal;
   a signal generator configured to generate a first synchronization signal based on the clock signal;

an electrode configured to transmit and receive an electrical signal through a body while contacting the body;
a switch configured to connect the signal generator and the electrode or block a connection between the signal generator and the electrode; and
at least one processor configured to:
control the switch to connect the signal generator and the electrode for transmitting the first synchronization signal generated in the signal generator to the electrode in a master mode, and
control the switch to block the connection between the signal generator and the electrode in a slave mode,
wherein the at least one processor is further configured to adjust at least one of a frequency or a phase of the clock signal based on a second synchronization signal received through the electrode from another wearable device worn on the body.

2. The wearable device of claim 1, wherein the at least one processor is further configured to synchronize the first synchronization signal with the second synchronization signal by adjusting at least one of the frequency or the phase of the clock signal.

3. The wearable device of claim 1, wherein the at least one processor is further configured to determine an operation mode of the wearable device as the slave mode, based on a signal with a period greater than or equal to a predetermined value being received through the electrode.

4. The wearable device of claim 1, wherein the at least one processor is further configured to determine an operation mode of the wearable device as the master mode, based on a signal with a period greater than or equal to a predetermined value not being received for a predetermined period of time.

5. The wearable device of claim 1, wherein the at least one processor is further configured to transmit a reset signal to the signal generator in response to detecting a falling edge of the second synchronization signal.

6. The wearable device of claim 1, further comprising:
a microphone,
wherein the at least one processor is further configured to process a sound signal received from the microphone based on the clock signal and the first synchronization signal.

7. The wearable device of claim 6, further comprising:
a communicator configured to wirelessly communicate with the other wearable device,
wherein the at least one processor is further configured to perform beamforming based on the sound signal received from the microphone and a sound signal received from a second microphone of the other wearable device.

8. The wearable device of claim 1, further comprising:
a communicator configured to wirelessly communicate with an external terminal,
wherein the at least one processor is further configured to process a sound signal received from the external terminal based on the clock signal and the first synchronization signal.

9. The wearable device of claim 8, wherein the at least one processor is further configured to control the communicator to transmit the first synchronization signal to the external terminal.

10. The wearable device of claim 1, wherein the at least one processor is further configured to control the switch to change an operation mode of the wearable device to the slave mode, based on the wearable device being operating in the master mode for a predetermined period of time.

11. A method of controlling a wearable device including an electrode that transmits and receives an electrical signal through a body while contacting the body, the method comprising:
generating, by a clock generator, a clock signal;
generating, by a signal generator, a first synchronization signal based on the clock signal;
determining an operation mode of the wearable device;
transmitting the first synchronization signal to the electrode in response to determining the operation mode of the wearable device as a master mode;
blocking a connection between the signal generator and the electrode in response to determining the operation mode of the wearable device as a slave mode; and
adjusting at least one of a frequency or a phase of the clock signal based on a second synchronization signal received through the electrode from another wearable device worn on the body, in the slave mode.

12. The method of claim 11, wherein the adjusting of the at least one of the frequency or the phase of the clock signal comprises:
synchronizing the first synchronization signal with the second synchronization signal by adjusting at least one of the frequency or the phase of the clock signal.

13. The method of claim 11, wherein the determining of the operation mode of the wearable device comprises:
determining the operation mode of the wearable device as the slave mode, based on a signal with a period greater than or equal to a predetermined value being received through the electrode.

14. The method of claim 11, wherein the determining of the operation mode of the wearable device comprises:
determining the operation mode of the wearable device as the master mode, based on a signal with a period greater than or equal to a predetermined value not being received for a predetermined period of time.

15. The method of claim 11, further comprising:
transmitting a reset signal to the signal generator in response to detecting a falling edge of the second synchronization signal.

16. The method of claim 11, further comprising:
processing a sound signal received from a microphone based on the clock signal and the first synchronization signal.

17. The method of claim 16, further comprising:
wirelessly communicating with the other wearable device and receiving a sound signal received from a second microphone provided in the other wearable device; and
performing beamforming based on the sound signal received from the microphone and the sound signal received from the second microphone.

18. The method of claim 11, further comprising:
wirelessly communicating with an external terminal and receiving a sound signal from the external terminal; and
processing the sound signal received from the external terminal based on the clock signal and the first synchronization signal.

19. The method of claim 18, further comprising:
transmitting the first synchronization signal to the external terminal.

20. The method of claim 11, further comprising:
changing the operation mode of the wearable device to the slave mode, based on the wearable device being operating in the master mode for a predetermined period of time.

* * * * *